US 9,289,942 B2

(12) United States Patent
Jensen et al.

(10) Patent No.: US 9,289,942 B2
(45) Date of Patent: Mar. 22, 2016

(54) DEVICE FOR USE IN APPLYING SELF ADHESIVE LABELS

(75) Inventors: Tonny Hubert Jensen, Brabrand (DK); Søren Skifter Bach, Viby J (DK)

(73) Assignee: Hubert Skilte Design ApS, Viby J (DK)

( * ) Notice: Subject to any disclaimer, the term of this patent is extended or adjusted under 35 U.S.C. 154(b) by 0 days.

(21) Appl. No.: 13/381,379

(22) PCT Filed: Jun. 29, 2010

(86) PCT No.: PCT/DK2010/050169
§ 371 (c)(1),
(2), (4) Date: Jan. 25, 2012

(87) PCT Pub. No.: WO2011/000379
PCT Pub. Date: Jan. 6, 2011

(65) Prior Publication Data
US 2012/0118508 A1 May 17, 2012

(30) Foreign Application Priority Data
Jun. 29, 2009 (DK) .................................. 2009 00804

(51) Int. Cl.
*B29C 65/00* (2006.01)
*B44C 7/00* (2006.01)
(Continued)

(52) U.S. Cl.
CPC ............... *B29C 63/0004* (2013.01); *B22C 1/10* (2013.01); *B29C 63/0047* (2013.01);
(Continued)

(58) Field of Classification Search
CPC ................. B29C 2063/027; B29C 2063/008; B29C 63/00; A47L 13/11; A47L 13/00; A47L 13/08; A47L 1/08; A47L 1/09; A47L 1/12; A47L 1/06; B25F 1/04; B25F 1/00; Y10T 156/1788; B29L 2031/283; B44C 1/10

USPC .......... 156/391, 510, 579; 248/309.4; 33/492, 33/486, 485, 483; 81/3.4; 15/236.6, 245, 15/121, 1.52, 21.52, 256.5, 111, 51, 93.1, 15/118, 236.01, 236.05; 30/169
See application file for complete search history.

(56) References Cited

U.S. PATENT DOCUMENTS 3,181,410 A * 5/1965 Phillips .................. G10D 3/163
206/314
5,312,321 A * 5/1994 Holcomb ......................... 600/9
(Continued)

FOREIGN PATENT DOCUMENTS

FR         2976849 A1 * 12/2012 .......... B29C 63/0004
JP         58160112 A  *  9/1983

OTHER PUBLICATIONS

TintDude.com, "Car Tinting, Installing Window Tinting Film", Jan. 4, 2007, Tinting Instructions.*
(Continued)

*Primary Examiner* — Alex Efta
(74) *Attorney, Agent, or Firm* — James Creighton Wray; Meera P. Narasimhan

(57) ABSTRACT

A device (1) for use in applying self adhesive labels, where the device (1) is formed by a plate (2) extending in a plane which is greater than the extension of the plate out of the plane, and having at least one side face (3) connecting a top side (4) and a bottom side (5), where at least one functional edge (6) is formed at least across part of the side face (3), where the device is handheld in use, wherein the device is provided with a parking position with a support face (7) of at least part of the top side (4) and/or the bottom side (5), and wherein the devices includes at least one permanent magnet (8).

12 Claims, 4 Drawing Sheets

(51) Int. Cl.
  *B32B 38/10*    (2006.01)
  *B29C 63/00*    (2006.01)
  *B29L 31/28*    (2006.01)
  *B22C 1/10*     (2006.01)
  *B29C 63/02*    (2006.01)
  *B29L 31/30*    (2006.01)

(52) U.S. Cl.
  CPC ............ *B29C 63/0056* (2013.01); *B29C 63/02* (2013.01); *B29C 2063/027* (2013.01); *B29L 2031/283* (2013.01); *B29L 2031/30* (2013.01); *Y10T 156/1788* (2015.01); *Y10T 156/18* (2015.01)

(56) References Cited

U.S. PATENT DOCUMENTS

| | | | | |
|---|---|---|---|---|
| 5,782,743 | A * | 7/1998 | Russell | ............................. 600/9 |
| 5,865,945 | A | 2/1999 | McConaughy | |
| 6,302,363 | B1 * | 10/2001 | Olson | ................... B42F 15/066 |
| | | | | 24/303 |
| 7,225,848 | B2 * | 6/2007 | Williams | ............ B29C 63/0047 |
| | | | | 156/574 |
| 2003/0068814 | A1 | 4/2003 | Malinge | |
| 2005/0023420 | A1 * | 2/2005 | Sadeh | ..................... B42F 1/006 |
| | | | | 248/206.5 |
| 2005/0109372 | A1 | 5/2005 | Massaro | |
| 2005/0241090 | A1 * | 11/2005 | Bogman | ................... B44C 1/10 |
| | | | | 15/121 |
| 2007/0031810 | A1 * | 2/2007 | Hoch et al. | ..................... 434/408 |
| 2007/0169299 | A1 * | 7/2007 | Stankovic | ............... A63F 3/068 |
| | | | | 15/236.01 |
| 2007/0194187 | A1 * | 8/2007 | Amron | ..................... B42F 1/04 |
| | | | | 248/206.5 |
| 2008/0307599 | A1 | 12/2008 | Gray | |
| 2010/0058918 | A1 * | 3/2010 | Risolia | ................... G10D 3/163 |
| | | | | 84/322 |

OTHER PUBLICATIONS

TintDude.com, "Car Tinting, Installing Window Tinting Film", Jan. 3, 2007, Bondo Card.*
K&J Magnetics, Inc., "The Original K&J Magnetic Calculator", https://kjmagnetics.com/calculator.asp., Apr. 3, 2015.*

* cited by examiner

DEVICE FOR USE IN APPLYING SELF ADHESIVE LABELS

This application claims the benefit of Danish Application No. PA 2009 00804 filed Jun. 29, 2009 and PCT/DK2010/050169 filed Jun. 29, 2010, International Publication Number WO 2011/00379 A1, which are hereby incorporated by reference in their entirety as if fully set forth herein.

FIELD OF THE INVENTION

The present invention concerns a device for use in applying self adhesive labels, where the device is formed by a plate extending in a plane which is greater than the extension of the plate out of the plane, and having at least one side face connecting a top side and a bottom side, where at least one functional edge is formed at least across part of the side face, where the device is handheld in use.

BACKGROUND OF THE INVENTION

In connection with applying adhesive labels on cars and buses, a handheld scraper of the type mentioned in the introduction is used for pressing the label against the base such that air bubbles are obviated.

The labels may have a considerable length. It is not uncommon with adhesive labels having a length up to several metres.

Application occurs by positioning the label on the base, which e.g. can be sloping, vertical or horizontal, edged or rounded. Then it is temporarily attached to the base with tape. During this step, the adhesive label is held by the fitter with one hand and by longer adhesive labels typically by means of an additional fitter. The tape, which is cut into small strips in beforehand, is fastened to the adhesive label and the base by the other hand of the fitter. Typically, several pieces of tape are fastened. When the adhesive label has been temporarily fastened to the base at the right position, the back paper is removed from the adhesive label from one end to the other while the tape is removed. The fitter holds the scraper in his hand, pressing it against the adhesive label as the adhesive label is fastened, without forming air bubbles between the base and the adhesive label.

This method is time-consuming with much disadvantage, especially when applying long adhesive labels, including application of adhesive labels on buses where two fitters are required for applying adhesive labels.

Since application of adhesive labels, in particular on buses, is done as piecework, it is desirable to optimise the method as much as possible so that the task can be performed in the shortest possible time, with as few tools as possible and with the least use of consumables, including tape.

OBJECT OF THE INVENTION

It is the object of the invention to indicate a solution that enables applying adhesive labels in a more rapid way.

DESCRIPTION OF THE INVENTION

According to the present invention, this is achieved by a device of the type specified in the introduction which is peculiar in that the device is provided with a parking position with a support face on at least part of the top side and/or the bottom side, and that the device includes at least one permanent magnet.

Hereby is achieved that the device can be temporarily attached to the base on the car or bus in the parking position by means of the at least one permanent magnet, irrespective of the slope of the base.

Hereby it becomes possible to substitute the function of the tape, as the device may be used for temporary retention of the adhesive label while it is positioned. The device hereby constitutes an extra hand.

Rapid application of adhesive labels becomes possible hereby as use of tape and the entailing steps are obviated.

The invention enables combining the function of the tape and the scraper in one and the same device, so that use of consumables is avoided and the fitter having to carry several types of tools as well.

By the invention is further achieved that the fitter may place the device in the parking position at an arbitrary point on the base and within reach during the steps in which the device is not in use. Hereby is avoided that the fitter is to use time for putting it in the pocket, on the roof of the car, on the ground or, as may also be the case, to hold it in the mouth with the consequent health hazards.

The at least one permanent magnet may optionally be disposed within or outside upon the device. It is most advantageous to place it inside the device as the known outer shape of the scraper may be retained hereby.

The surface of the device may advantageously be provided with fluted or granulated surface at the area where the user is gripping in order for the user to get a more secure grip. Alternatively, the surface may be formed of a material with great friction, including rubber.

According to a further embodiment, the device according to the invention is peculiar in that the device has a thickest area from which the thickness of the device decreases towards the at least one functional edge.

Hereby is achieved that the device becomes easy to hold as the fitter can grip around the thickest area and achieve contact with not only the fingers but the entire palm.

Moreover is achieved that the area between the thickest area and the at least one functional edge may be used as a work face when the device is used as scraper for removing air bubbles.

The thickest area may have a flat or rounded surface. Alternatively, the thickest area may be designed such that it is ergonomically adapted to the fitter's hand in order to give the fitter a better grip.

According to a further embodiment, the device according to the invention is peculiar in that the support face is provided at the thickest area.

Hereby is achieved that the device may easily be released from the base in that the fitter presses his fingers on the area between the support face and the functional edge. Since the thickness in this area is decreasing compared with the thickest area, the device will tilt about a tilting edge formed at the transition between the thickest area and the area between the support face and the functional edge. This means that the opposing part of the device and the thickest area pivots off the base such that the fitter may easily grip around the device and release it from the base.

The support face can be provided as a plane surface or as a plane formed between two or more discrete line segments or three or more discrete points.

In a particularly advantageous embodiment, the device is peculiar in that the at least one permanent magnet is provided within the thickest area.

Hereby, it is achieved that the magnetic attraction between the base and the at least one permanent magnet is easily overcome as by pressing on the area between the support face and the functional edge, a lever arm is formed at respective sides of the tilt edge.

It is advantageous that the at least one permanent magnet is provided as close to the tilt edge as possible in order to form as small lever arm as possible between the magnet and the tilt edge relative to the lever arm between the pressed point and the tilt edge.

According to a further embodiment, the device according to the invention is peculiar in that at least one projection is formed on the thickest area.

Hereby is achieved that the device is supported by the projections in the parking position. This is particularly useful when applying the device on a base which is not flat, as the base may curve or have steps in an area between the projections without the device loosing its contact with the base.

According to a further embodiment, the device according to the invention is peculiar in that at least one permanent magnet is embedded in the at least one projection.

Hereby, the device is well retained on the base as the at least one projection will form the support face. By embedding a permanent magnet in each projection, the support face will achieve having magnetic attraction for retaining the device on the base.

According to a further embodiment, the device according to the invention is peculiar in that the device is made of a plastic material by injection moulding.

Hereby is achieved a particularly simple manufacturing method enabling simple serial production. Advantageously, a plastic material which is simple to mould by injection and which is wear resistant can be chosen.

It is prior art to make plastic materials which are electrically conducting and which may be magnetised, either based on molecular properties or by embedded magnetiseable material which is magnetised during moulding or after moulding. Such a material may alternatively be chosen such that the entire device becomes magnetic.

According to a further embodiment, the device according to the invention is peculiar in that the at least one permanent magnet is moulded into the device.

Hereby is achieved that the at least one magnet is protected by the plastic material and cannot be released inadvertently.

According to a further embodiment, the device according to the invention is peculiar in that the shape of the plate is selected among one or a combination of the following: a square, a rectangle, a circle an oval, a polygon.

The shape of the plate is chosen according to the application. The four-edged, rectangular or polygonal shapes with straight sides as functional edges are selected when the adhesive labels are applied on a flat base whereas the circular or oval shapes with rounded side segments as functional edge are selected when the adhesive labels are applied a base with roundings.

Alternatively, the shapes may be combined so that the same device has straight and rounded side faces with functional edges so that the same device can be used for both applications.

According to a further embodiment, the device according to the invention is peculiar in that the device has a first symmetry plane which is parallel with the plane.

Hereby is achieved that the device can be used regardless of the top side or the bottom side being uppermost, as the top side and bottom side are symmetrical and thus identical shape.

The mentioned plane refers to the plane through the plate having an extension in the plane which is greater than the extension of the plane out of the plane. It is thus a symmetry plane through the plate.

Moreover, it provides manufacturing advantages since design and production of moulding tools are simplified.

According to a further embodiment, the device according to the invention is peculiar in that the device has at least one other symmetry plane which is perpendicular to the plane.

Hereby is achieved that the device becomes more simple to produce since it provides manufacturing advantages because design and production of moulding tools are simplified.

The device will typically have at least two symmetry planes. One plane at right angles to the other plane.

In an alternative embodiment of the invention, it has an infinite number of symmetry planes that are perpendicular to the plane. This is the case when the device has a circular shape.

The mentioned plane refers to the plane through the plate having an extension in the plane which is greater than the extension of the plane out of the plane. It is thus a symmetry plane through the plate.

DESCRIPTION OF THE DRAWING

The invention will now be explained more closely with reference to the accompanying drawing, where.

In the explanation of the Figures, identical or corresponding elements will be provided with the same designations in different Figures. Therefore, no explanation of all details will be given in connection with each single Figure/embodiment.

DETAILED DESCRIPTION OF THE INVENTION

Figure 1:
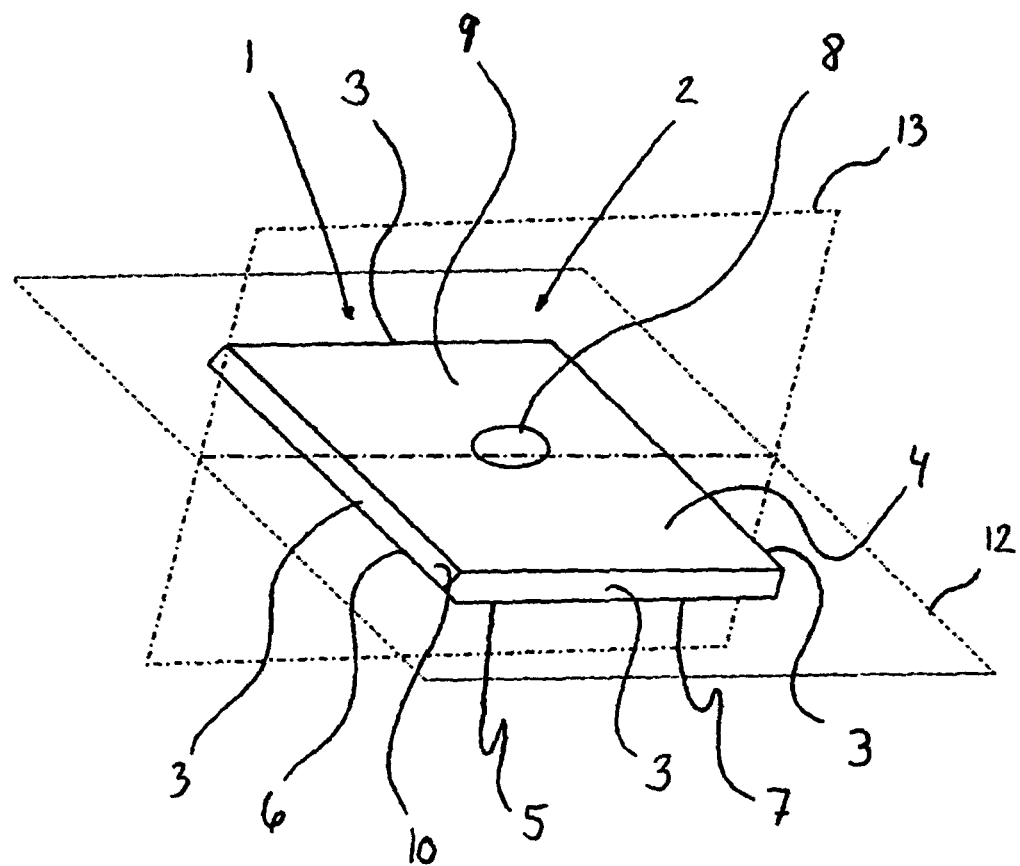
FIG. 1 shows a perspective view of a first embodiment of the invention.

FIG. 1 shows a first embodiment of the device 1 for use in applying adhesive labels. The device 1 is formed by a plate 2 having an extension in a plane which is greater than the extension of the plane out of the plane.

In the shown embodiment, the plate has four side faces 3 connecting a top side 4 and a bottom side 5.

A functional edge 6 is formed along part of one side face 3. This functional edge is used when the device is in use as scraper for manual application of adhesive labels.

The device 1 has a parking position when not in use with a support face 7 on at least part of the top side 4 and/or the bottom side 5, as the device may be turned upwards or downwards.

In the parking position, the device 1 is retained on the base by means of a permanent magnet 8.

The device 1 is used during application of labels on surfaces that can be magnetised. Of typical applications can be mentioned advertisements on buses and cars, or firm names.

The shown first embodiment of the device 1 has a first symmetry plane 12 which is parallel with the plane of the plate. Therefore, the top side 4 and bottom side 5 of the plate are uniform. Thus is it unimportant which side 4, 5 is facing up and down during use and parking.

In the shown embodiment, the device 1 has a second symmetry plane 13 which is perpendicular to the plane of the plate and thereby perpendicular to the first symmetry plane 12.

Figure 2:
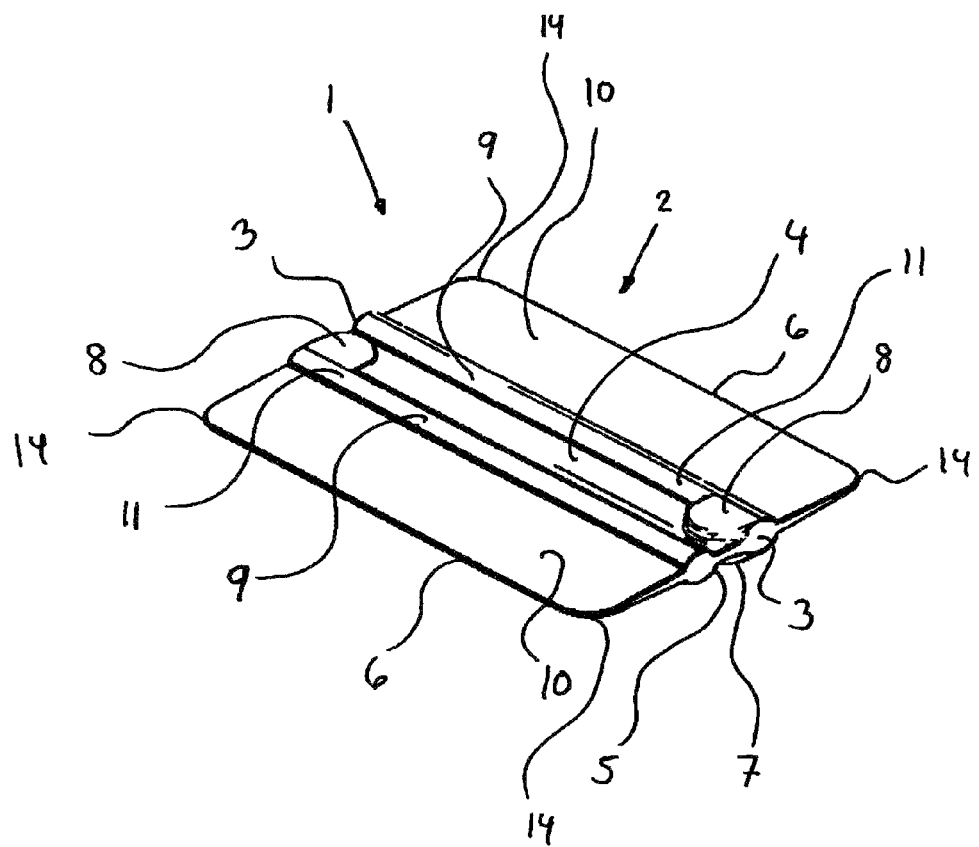
FIG. 2 shows an isometric view of a second embodiment of the invention.
Figure 3:
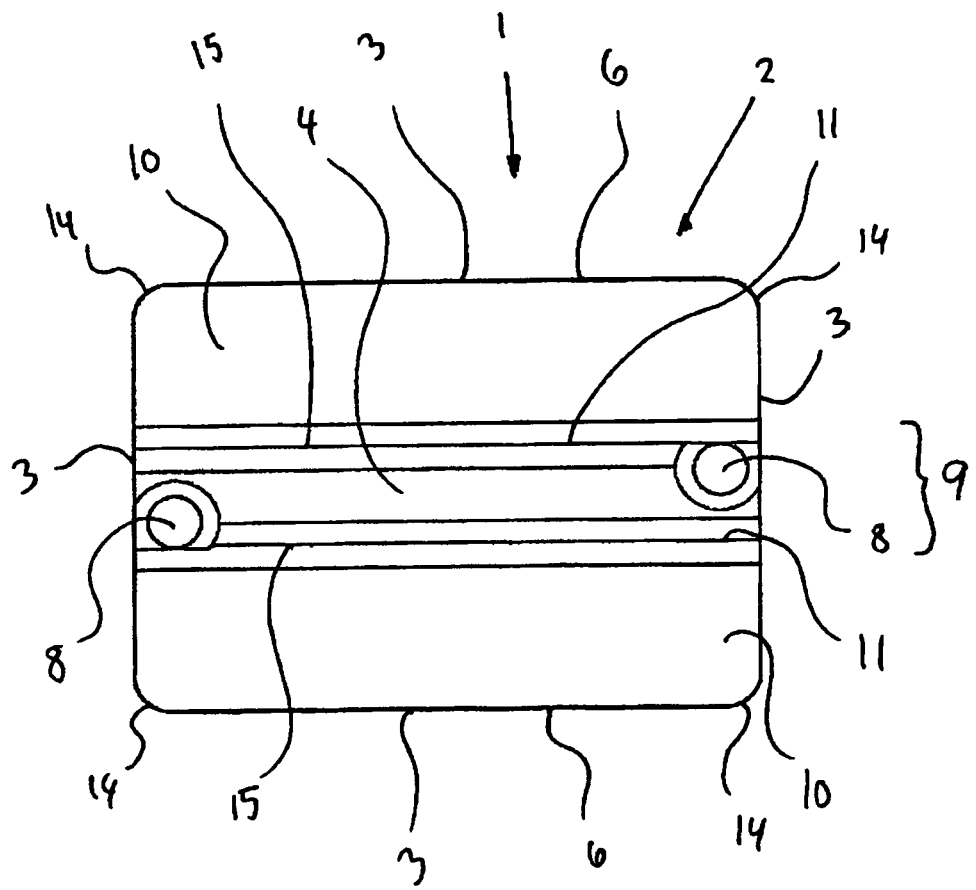
FIG. 3 shows a plan view of the second embodiment of the invention.
Figure 4:
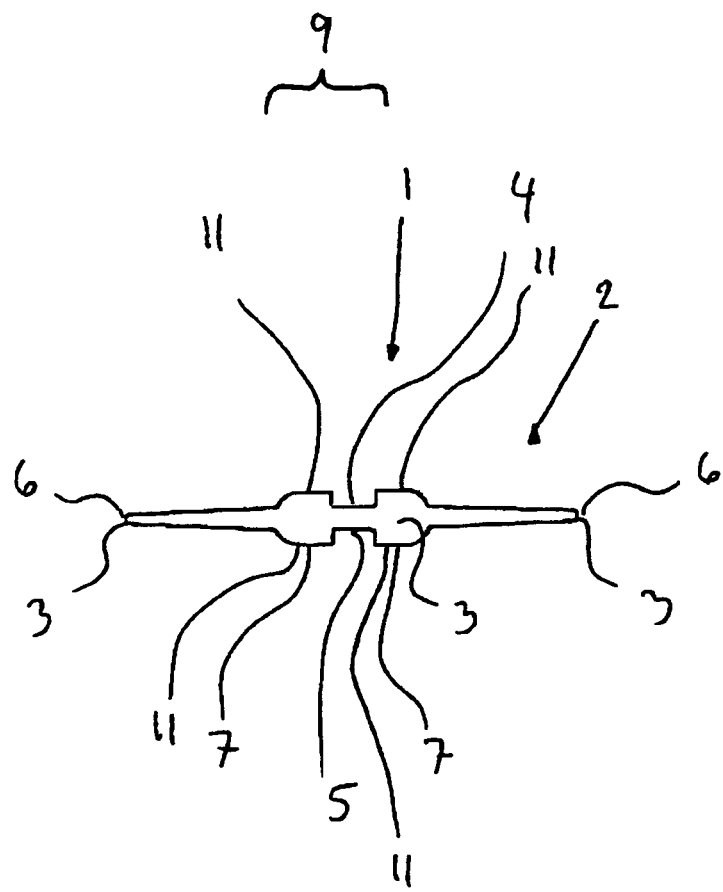
FIG. 4 shows a side view of the second embodiment of the invention.

FIGS. 2-4 show a second embodiment of the device 1. In this embodiment, the device 1 is a rectangular plate 2 with rounded corners 14. The device 1 has a top side 4 and a bottom side 5 that are connected by side faces 3.

The device 1 is provided with two functional edges 6 disposed on opposing side faces 3.

The device 1 has a thickest area 9 from which the thickness of the device decreases towards the functional edges 6. Each area 10 between the thickest area 9 and the functional edge 6 therefore has a wedge-shaped cross-section.

Two projections 11 are formed at the thickest area at each side of the device 1. These projections 11 are each formed with a largely semicircular cross-section extending across the width of the device, and a part encapsulating the two permanent magnets 8. In the parking position, the device 1 is supported by these projections at the side 4, 5 closest to the base. The support face 7 is defined as a plane through two lines, one on each of the semicircular projections which have coinciding tangents. These lines additionally define a tilt edge 15 about which the device 1 tilts by pressing on the area 10 between the thickest area 9 and the functional edge 6.

The permanent magnets 8 are disposed close to each their tilt edge for forming a symmetric lever arm such that the force to be applied for releasing the magnets is equally large, regardless on which of the two areas 10 between the thickest area 9 and the functional edge 6 pressure is applied.

In the second embodiment, the device 1 may advantageously be produced by injection moulding and with the permanent magnets 8 moulded into the device 1.

In the second embodiment, the device 1 has a symmetry plane (not shown) which is parallel with the plane of the plate. The device 1 may thus be used regardless of one or the other side facing upwards.

The invention claimed is:

1. A device comprising a handheld applier of self adhesive labels, further comprising a plate having a first edge, a second opposite edge, a top side and a bottom side between the first edge and the second edge, where the device is formed by a first extension of the plate extending in a first plane which is greater than a second extension of the plate in a second plane out of the first plane, the first edge and the second edge of the plate defining the first plane, and having at least one side face connecting the top side and the bottom side of the plate, where at least one functional edge is formed at least across part of the at least one side face between the top side and the bottom side, where the device is handheld in use, wherein the device is provided with a parking position with a support face on at least part of the top side and/or the bottom side, wherein the support face has at least one projection extending across the device from the first edge to the second edge, wherein the at least one projection defines a tilt edge between the first edge and the second edge of the plate, wherein the device includes at least one permanent magnet, wherein the device has a thickest area from which the thickness of the device decreases toward the at least one functional edge, and wherein the at least one permanent magnet is embedded in the thickest area, wherein the at least one permanent magnet is configured to temporarily attach the support face to a base when the device is in the parking position and not in use, wherein the at least one permanent magnet has a magnetic strength to hold the device remaining attached on a base irrespective of a slope of the base, until removed by the user when the device is held with the parking position and the support face on the base and not in use; and the at least one permanent magnet allows the device to be tilted around the tilt edge on the base about the second plane and to be removed from the base.

2. The device according to claim 1, wherein the support face is provided at the thickest area.

3. The device according to claim 1, wherein the at least one projection is formed on the thickest area.

4. The device according to claim 3, wherein at least one permanent magnet is embedded in the at least one projection.

5. The device according to claim 1, wherein the device is made of a plastic material by injection moulding.

6. The device according to claim 5, wherein at least one permanent magnet is moulded into the device.

7. The device according to claim 1, wherein the shape of the plate is selected among one or a combination of the following: a square, a rectangle, a circle, an oval, a polygon.

8. The device according to claim 1, wherein the device has a first plane of symmetry which is parallel with the first plane and/or second plane.

9. The device according to claim 1, wherein the device has at least one second plane of symmetry which is perpendicular to the first plane and/or second plane.

10. A device for use in applying self adhesive labels,
wherein the device is formed by a plate extending in a plane which is greater than an extension of the plate out of the plane, and having at least one side face connecting a top side and a bottom side;
wherein two functional edges are formed at least across part of the at least one side face;
wherein the device is provided with a parking position with a support face on at least part of the top side and/or the bottom side;
wherein the device includes at least one permanent magnet;
wherein the device has a thickest area from which the thickness of the device decreases toward the two functional edges;
wherein the at least one permanent magnet is embedded in the thickest area;
wherein the top side or the bottom side of the device has two projections that are formed at the thickest area, wherein the projections extend across an entire width of the top side or the bottom side of the device;
wherein the at least one permanent magnet is between the two projections, wherein the at least one permanent magnet has a magnetic strength to hold the device remaining attached on a base irrespective of a slope of the base, until removed by the user when the device is held with the parking position and the support face on the base and not in use; and the at least one permanent allows the device to be tilted on the base and to be removed from the base.

11. An apparatus comprising:
a self adhesive material smoothing device, the device further comprising:
a plate having a first edge and a second edge and extending such that a first extension of the plate extends in a first plane defined by the first edge and the second edge, the first plane being greater than a second extension of the plate in a second plane out of the first plane, the plate having a top side, a bottom side, and side faces connecting the top side and the bottom side;
at least one functional edge formed across at least one of the side faces between the first edge and the second edge;
a thickest area from which the thickness of the device decreases toward the at least one functional edge;
a parking position with a support face on at least part of the top side and/or the bottom side;

the support face having at least one projection extending across the device from the first edge to the second edge;

at least one permanent magnet connected to the plate adjacent to the parking position in the thickest area of the plate;

the at least one permanent magnet having a magnetic strength to hold the device remaining attached on a base until removed by the user, when the device is held with the parking position and the support face on the base and not in use; and the at least one permanent magnet allowing the device to be tilted about the second plane on the base and to be removed from the base.

12. The apparatus according to claim 11, wherein the thickest area of the plate occupies a central portion of the plate.

* * * * *